(12) United States Patent  
Kim

(10) Patent No.: US 8,312,974 B2
(45) Date of Patent: Nov. 20, 2012

(54) DISC BRAKE FOR VEHICLE

(75) Inventor: Joo Gon Kim, Gyeonggi-do (KR)

(73) Assignee: Mando Corporation, Gyeonggi-do (KR)

( * ) Notice: Subject to any disclaimer, the term of this patent is extended or adjusted under 35 U.S.C. 154(b) by 475 days.

(21) Appl. No.: 12/615,149

(22) Filed: Nov. 9, 2009

(65) Prior Publication Data

US 2010/0116599 A1 May 13, 2010

(30) Foreign Application Priority Data

Nov. 10, 2008 (KR) .......................... 10-2008-110938

(51) Int. Cl.
  *F16D 55/08* (2006.01)
(52) U.S. Cl. ..................... 188/72.8; 188/71.1; 188/72.1; 188/73.1; 188/343
(58) Field of Classification Search .................. 188/72.8, 188/70 B, 71.1, 72.1, 72.2, 72.6, 72.7, 73.1, 188/156, 157, 324, 343
See application file for complete search history.

(56) References Cited

U.S. PATENT DOCUMENTS

| 5,107,967 | A | 4/1992 | Fujita et al. | |
| 6,978,868 | B2* | 12/2005 | Schautt | 188/72.7 |
| 2009/0020377 | A1* | 1/2009 | Kim | 188/18 A |
| 2009/0099747 | A1* | 4/2009 | Kim | 701/70 |
| 2011/0127123 | A1* | 6/2011 | Chun | 188/72.7 |

FOREIGN PATENT DOCUMENTS

| DE | 197 11 382 A1 | 10/1998 |
| DE | 101 56 348 C1 | 4/2003 |
| DE | 10 2005 055 445 A1 | 5/2007 |
| DE | 10 2006 002 308 A1 | 7/2007 |
| DE | 10 2007 013 421 A1 | 9/2008 |
| DE | 10 2008 027 678 A1 | 1/2009 |
| DE | 10 2008 024 536 A1 | 4/2009 |
| KR | 10-2007-0104058 A | 10/2007 |

OTHER PUBLICATIONS

German Office Action issued in German Patent Application No. 10 2009 052 193.3-12 dated Aug. 26, 2010.

* cited by examiner

*Primary Examiner* — Pamela Rodriguez
(74) *Attorney, Agent, or Firm* — McDermott Will & Emery LLP

(57) ABSTRACT

A disc brake for a vehicle, reduced in volume by improving a driving unit thereof that presses a wedge and therefore conveniently installed in the vehicle. The disc brake includes a disc rotated along with wheels of the vehicle, inner and outer friction pads disposed at both sides of the disc, a caliper housing supporting the outer friction pad, a wedge member disposed at a rear side of the inner friction pad and formed with inclined surfaces on a rear side thereof, a supporting member formed with inclined surfaces corresponding to the inclined surfaces of the wedge member and fixed to the caliper housing, and a driving unit operating the wedge member to perform a braking operation. The driving unit includes a screw axis, a driving motor, a worm gear constituted by a worm and a worm wheel, and a moving member.

17 Claims, 4 Drawing Sheets

DISC BRAKE FOR VEHICLE

CROSS-REFERENCE TO RELATED APPLICATION(S)

This application claims the benefit of Korean Patent Application No. 2008-0110938, filed on Nov. 10, 2008 in the Korean Intellectual Property Office, the disclosure of which is incorporated herein by reference.

BACKGROUND

1. Field

Embodiments of the present invention relate to a disc brake for a vehicle, equipped with a wedge member to press a friction pad toward a disc.

2. Description of the Related Art

A disc brake is an apparatus pressing an outer surface of a disc rotating along with wheels, by a friction pad, to thereby generate a braking force. Some disc brakes utilize a sliding wedge member having an inclined surface to press the friction pad toward the disc. That is, as the wedge member is slid along the inclined surface by the operation of a driving unit, the wedge member presses the friction pad toward the disc.

The driving unit operating the wedge member includes a driving motor, a screw axis connected to a rotational shaft of the driving motor, and a pressing member connected to the screw axis to be moved back and forth according to the operation of the driving motor and thereby press the wedge member toward the disc.

The above-structured disc brake operates in the following manner. As the driving motor operates, the pressing member presses the wedge member toward the disc, thereby bringing the friction pad into contact with the disc. Simultaneously, the wedge member is slid along the inclined surface, thereby further pressing the friction pad toward the disc. As a result, the braking operation is achieved.

In the above-described disc brake, however, the driving motor to press the pressing member is extended in a direction of the back and forth movement of the pressing member, that is, in a direction for the friction pad to press the disc. Therefore, the volume of the disc brake is increased, especially in one direction. Accordingly, installation of the disc brake becomes complicated.

SUMMARY

Therefore, it is an aspect of the present invention to provide a disc brake for a vehicle, capable of reducing the total volume thereof by improving a driving unit that presses a wedge, and accordingly improving convenience in installation.

Additional aspects of the invention will be set forth in part in the description which follows and, in part, will be obvious from the description, or may be learned by practice of the invention.

In accordance with one aspect of the present invention, a disc brake for a vehicle includes a disc rotated along with wheels of the vehicle, inner and outer friction pads each disposed at both sides of the disc, a caliper housing supporting the outer friction pad, a wedge member disposed at a rear side of the inner friction pad and formed with inclined surfaces on a rear surface thereof, a supporting member formed with inclined surfaces corresponding to the inclined surfaces of the wedge member and fixed to the caliper housing, and a driving unit operating the wedge member to perform a braking operation. The driving unit includes a screw axis mounted to the supporting member and extended in a rotating direction of the disc, a driving motor mounted to the supporting member to drive the screw axis, in a manner that a shaft thereof is mounted in a direction across the screw axis and a pressing direction of the inner friction pad, a worm gear constituted by a worm formed at the shaft of the driving motor and a worm wheel mounted to the screw axis to be engaged with the worm, and a moving member connected to the screw axis and moved by rotation of the screw axis, thereby pressing the wedge member in a rotating direction of the disc.

The wedge member may have the inclined surfaces symmetrically formed into a ridge shape on both sides of a rear surface thereof.

The worm wheel may be mounted in the middle of the screw axis, and the moving member is mounted to the screw axis at both sides of the worm wheel.

The wedge member may include locking recesses for engagement with the moving members, and guide members mounted in the locking recesses to guide the operation of the wedge member.

The supporting member may have a motor receiving part receiving part of the driving motor.

BRIEF DESCRIPTION OF THE DRAWINGS

These and/or other aspects of the invention will become apparent and more readily appreciated from the following description of the embodiments, taken in conjunction with the accompanying drawings of which.

DETAILED DESCRIPTION

Figure 1:
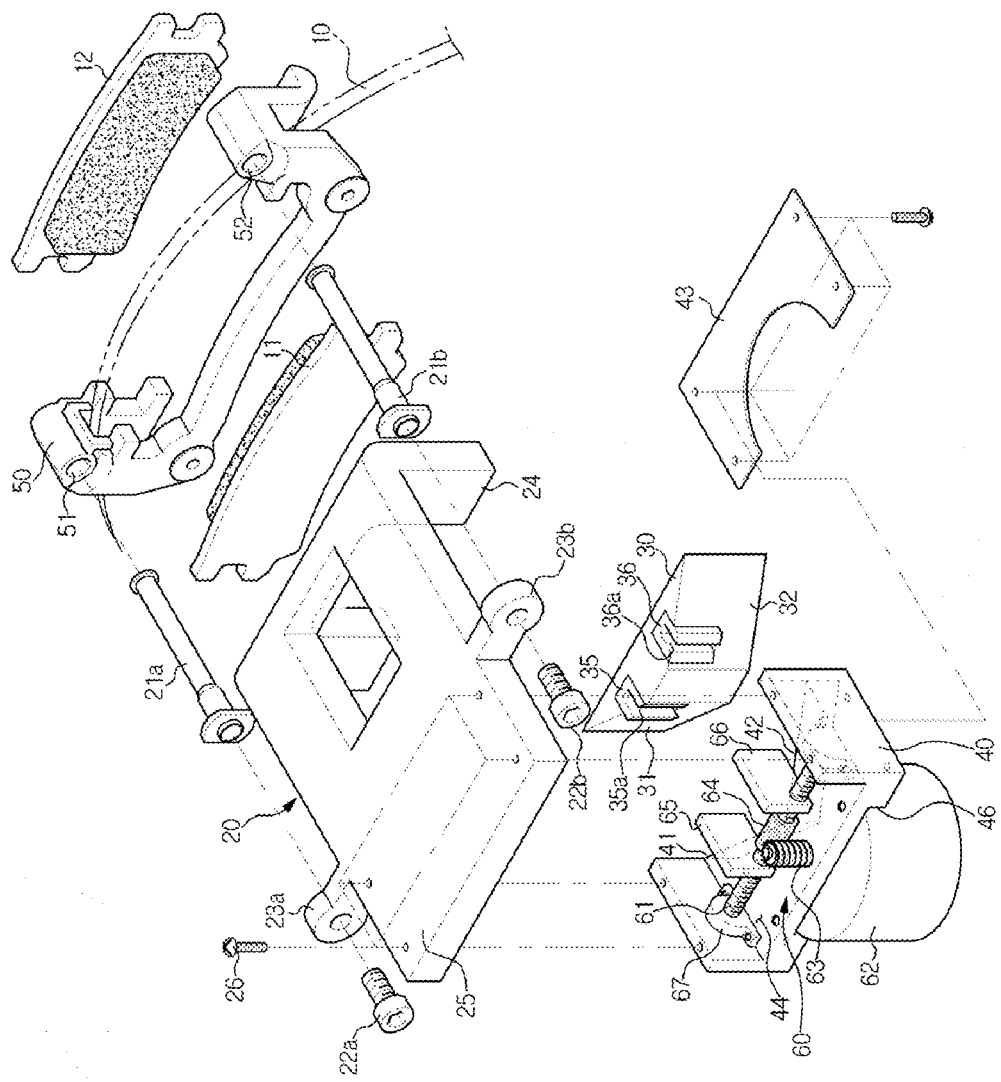
FIG. 1 is an exploded perspective view of a disc brake for a vehicle, according to an embodiment of the present invention.

Reference will now be made in detail to the embodiments of the present invention, examples of which are illustrated in the accompanying drawings, wherein like reference numerals refer to like elements throughout.

Figure 2:
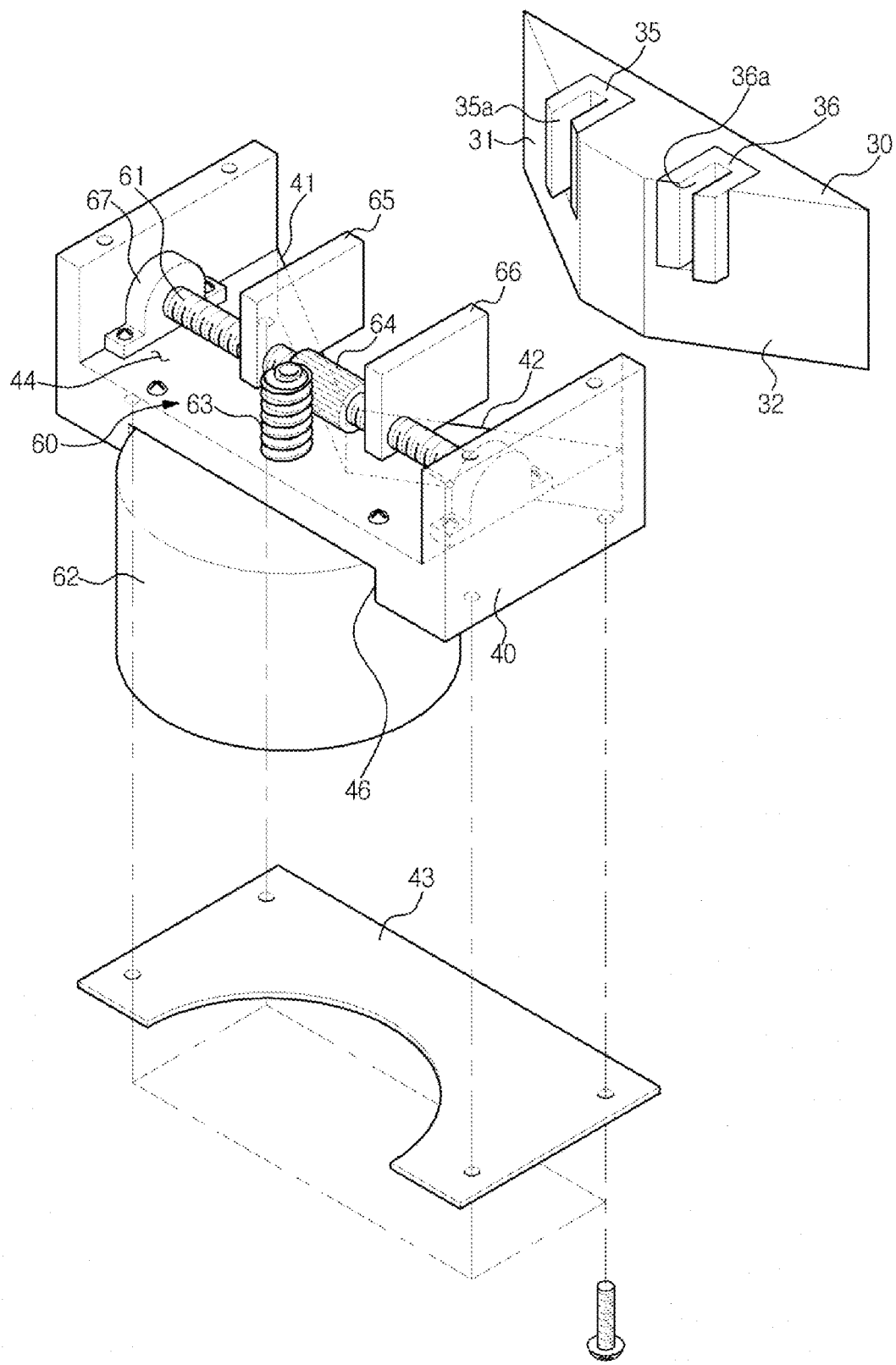
FIG. 2 is a perspective view showing a driving unit of the vehicle disc brake according to the embodiment of the present invention.
Figure 3:
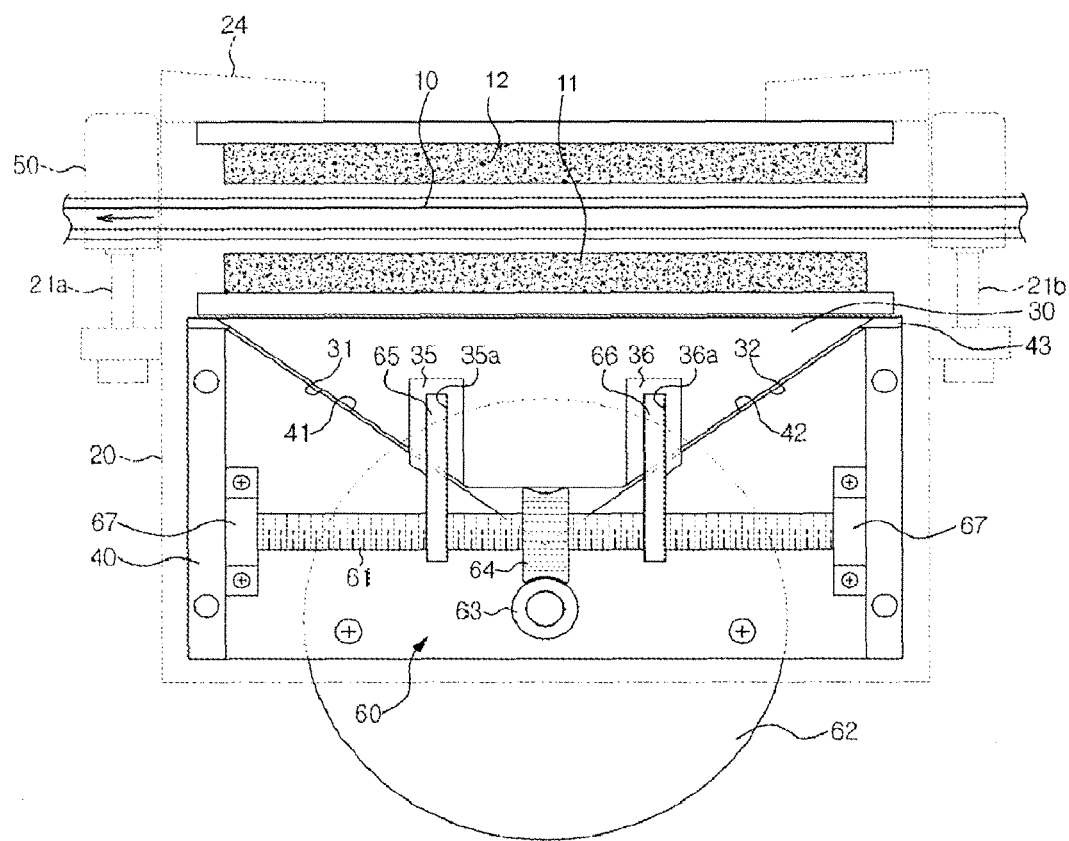
FIG. 3 is a view showing a brake-released state of the vehicle disc brake.

Referring to FIG. 1 to FIG. 3, a disc brake for a vehicle according to an embodiment of the present invention includes a disc 10 rotated along with wheels (not shown) of the vehicle, and inner and outer friction pads 11, 12 disposed at both sides of the disc 10, respectively, to frictionally brake the disc 10. Additionally, the disc brake includes a caliper housing 20 and a wedge member 30 pressing the two friction pads 11 and 12 toward the disc 10, a supporting member 40 supporting the wedge member 30, and a driving unit 60 operating the wedge member 30 to press the inner friction pad 11.

The inner and outer friction pads 11 and 12 are supported by a carrier 50 fixed to a knuckle part (not shown) of the vehicle, to be movable back and forth and thereby press both sides of the disc 10. Also, the caliper housing 20 is connected to both sides of the carrier 50 to be movable back and forth, through guide rods 21a and 21b connected to both sides thereof. The guide rods 21a and 21b are connected at rod connection parts 23a and 23b formed on both sides of the caliper housing 20 through fixing screws 22a and 22b, respectively. The caliper housing 20 includes a bent extension part 24 formed at an end thereof to press an outer surface of the outer friction pad 12 by moving back and forth, and a pressing member connection part 25 formed at the opposite end for connection with the supporting member 40. The supporting member 40 is fixed to the caliper housing 20 at both upper sides thereof through fixing screws 26.

The wedge member 30 is disposed at a rear side of the inner friction pad 11. Inclined surfaces 31 and 32 are symmetrically formed into a ridge form, on both sides of a rear surface of the wedge member 30. Corresponding to the inclined surfaces 31 and 32, the supporting member 40 that supports the wedge member 30 has inclined surfaces 41 and 42 formed into a V-section depression to be connected with the inclined surfaces 31 and 32. Therefore, when the wedge member 30 is pressed in a rotating direction of the disc 10, the inclined surfaces 31 and 32 of the wedge member 30 are pressed in contact with the inclined surfaces 41 and 42 of the supporting member 40, thereby pressing the inner friction pad 11 toward the disc 10. Additionally, a supporting plate 43 is connected to a lower part of the supporting member 40 to support the wedge member 30 and prevent downward separation of the wedge member 30.

As shown in FIG. 2, the driving unit 60 that operates the wedge member 30 for the braking operation is mounted to the supporting member 40. The driving unit 60 includes a screw axis 61 mounted in a space part 44 disposed at an upper part of the supporting member 40, being extended in the rotating direction of the disc 10, and a driving motor 62 disposed at a lower part of the supporting member 40 to drive the screw axis 61. The driving motor 62 is disposed such that a shaft thereof, the screw axis 61 and a pressing direction of the inner friction pad 11 cross one another. The driving unit 60 further includes a worm gear constituted by a worm 63 mounted at the shaft of the driving motor 62, and a worm wheel 64 mounted in the middle of the screw axis 62 to be engaged with the worm 63, and first and second moving members 65 and 66 connected with the screw axis 61 and moved in accordance with rotation of the screw axis 61, thereby pressing the wedge member 30 in the rotating direction of the disc 10.

More specifically, both ends of the screw axis 61 are rotatably supported by axis connection members 67 fixed at both sides of the space part 44. The first and the second moving members 65 and 66 are extended by a predetermined length toward the wedge member 30, in a state of being connected with the screw axis 61 at both sides of the worm wheel 64. The wedge member 30 includes locking recesses 35a and 36a for engagement with the first and the second moving members 65 and 66, respectively. First and second guide members 35 and 36 are mounted in the locking recesses 35a and 36a, to guide the operation of the wedge member 30. When the moving members 65 and 66 are moved by rotation of the screw axis 61, the wedge member 30 is pressed in the rotating direction of the disc 10 and simultaneously moved toward the inner friction pad 11, thereby pressing the inner friction pad 11.

The driving motor 62 is mounted in a manner that an upper part thereof is received in a motor receiving part 46 disposed at a lower part of the supporting member 40. The shaft of the driving motor 62 is mounted penetrating the supporting member 40 in a vertical direction. The worm 63 of the worm gear is connected with the shaft of the driving motor 62.

The shaft of the driving motor 62 of the driving unit 60 that operates the wedge member 30 is disposed across the pressing direction of the outer friction pad 12. The driving motor 62 is disposed at a lower part of the supporting member 40. Therefore, the total volume of the disc brake may be reduced, especially in a direction in which the outer friction pad 12 presses the disc 10. Accordingly, the disc brake may be conveniently installed even in a narrow space around the knuckle part of the vehicle.

Hereinafter, the operation of the above-described disc brake will be explained.

Figure 4:
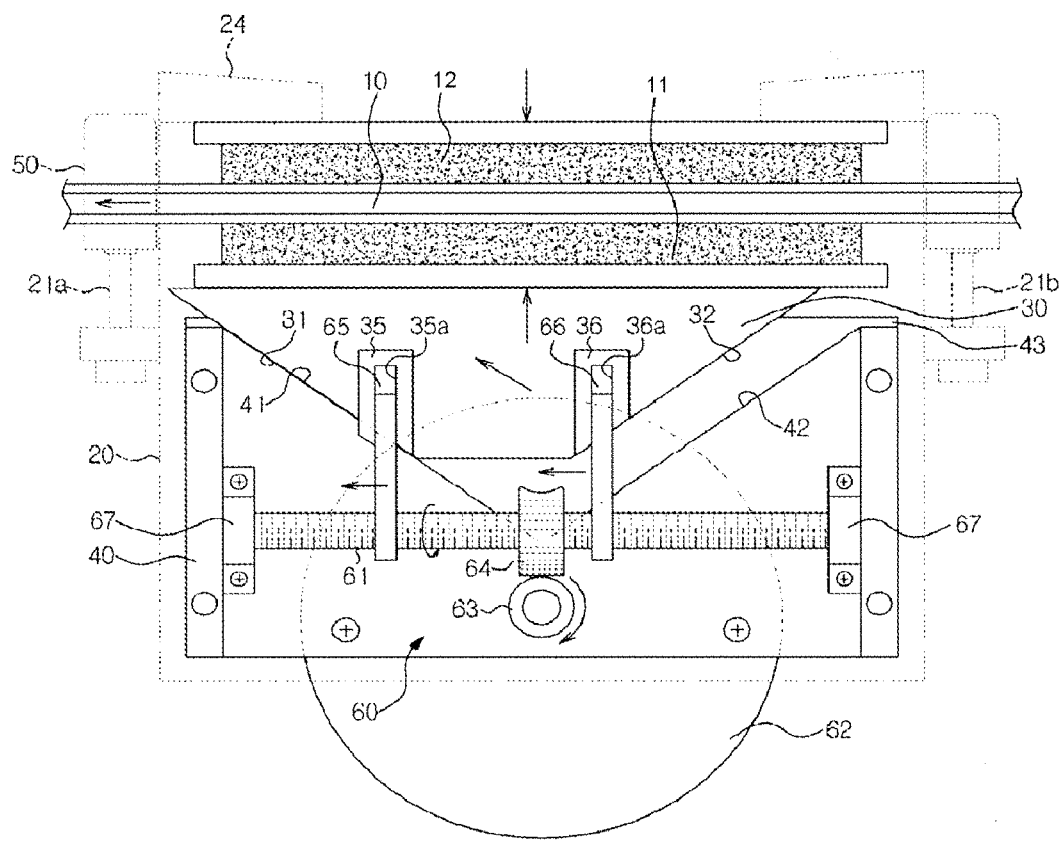
FIG. 4 is a view showing a braking state of the vehicle disc brake.

In FIG. 3, the vehicle is in a released state. When the braking operation is started in this state, the worm 63 is rotated by the driving motor 62, and the worm wheel 64 performs reduction-rotation according to rotation of the worm 63 as shown in FIG. 4. In addition, the worm wheel 64 rotates the screw axis 61 by a great force corresponding to the reduced rotation. When the screw axis 61 is rotated, the first and the second moving members 65 and 66 are moved in the length direction of the screw axis 61, thereby pressing the wedge member 30 in the rotating direction of the disc 10. Accordingly, the inclined surface 31 formed on the rear surface of the wedge member 30 is pushed out in contact with the inclined surface 41 of the supporting member 40. As a result, the inner friction pad 11 is pressed toward the disc 10, thereby braking the disc 10.

When the inner friction pad 11 is brought into contact with the disc 10, the wedge member 30 is apt to move in the rotating direction of the disc 10 by the force of the inner friction pad 11 which is apt to move in the rotating direction of the disc 10. Such a self-returning force increases the braking force.

As the inner friction pad 11 thus presses the disc 10, a reactive force is exerted to the caliper housing 20. Therefore, the caliper housing 20 is moved in the opposite direction to the pressing direction of the inner friction pad 11, thereby pressing the outer friction pad 12 toward the disc 10. As a result, almost the same degrees of friction are generated at both sides of the disc 10.

In order to release the braking force, the driving motor 62 is operated in the reverse direction, thereby rotating the screw axis 61 in the reverse direction such that the moving members 65 are moved in the opposite direction. Therefore, the pressure exerted to the inner friction pad 11 by the wedge member 30 is released.

Although not shown, the driving motor 62 includes a brake releasing unit allowing a user to manually rotate the shaft of the driving motor 62. The brake releasing unit may be formed at the shaft disposed at the opposite side to where the worm 63 is mounted. The user may directly rotate the brake releasing unit (not shown) formed at the shaft when attempting to manually release the braking.

As is apparent from the above description, a disc brake for a vehicle according to the embodiment of the present invention is structured in a manner that a shaft of a driving motor of a driving unit that operates a wedge member is mounted across a pressing direction of a friction pad, and the driving motor is disposed at a lower part of the supporting member. Therefore, reduction in total volume is achieved, especially in the pressing direction of the friction pad. Consequently, the disc brake may be conveniently installed even in a narrow space around a knuckle part of the vehicle.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A disc brake for a vehicle, comprising a disc rotated along with wheels of the vehicle, an inner friction pad and an outer friction pad disposed at both sides of the disc, a caliper housing supporting the outer friction pad, a wedge member disposed at a rear side of the inner friction pad and formed with inclined surfaces on a rear surface thereof, a supporting member formed with inclined surfaces corresponding to the inclined surfaces of the wedge member and fixed to the caliper housing, and a driving unit operating the wedge member to perform a braking operation, wherein the driving unit comprises:
a screw axis mounted to the supporting member and extended in a rotating direction of the disc;
a driving motor mounted to the supporting member to drive the screw axis, in a manner that a shaft thereof is mounted in a direction across the screw axis and a pressing direction of the inner friction pad;
a worm gear constituted by a worm formed at the shaft of the driving motor and a worm wheel mounted to the screw axis to be engaged with the worm; and
a moving member connected to the screw axis and moved by rotation of the screw axis, thereby pressing the wedge member in a rotating direction of the disc.

2. The disc brake according to claim 1, wherein the wedge member has the inclined surfaces symmetrically formed into a ridge shape on both sides of a rear side thereof.

3. The disc brake according to claim 2, wherein the supporting member comprises a V-section depression shaped corresponding to the inclined surfaces of the wedge member.

4. The disc brake according to claim 1, wherein the worm wheel is mounted in the middle of the screw axis, and the moving member is mounted to the screw axis at both sides of the worm wheel.

5. The disc brake according to claim 1, wherein the wedge member comprises:
locking recesses for engagement with the moving member; and
guide members mounted in the locking recesses to guide the operation of the wedge member.

6. The disc brake according to claim 1, wherein the supporting member has a motor receiving part receiving part of the driving motor.

7. The disc brake according to claim 1, wherein the supporting member further comprises a supporting plate supporting the wedge member.

8. A disc brake for a vehicle, comprising an inner friction pad and an outer friction pad disposed at both sides of a disc rotated along with wheels of the vehicle, wedge members each disposed at rear sides of the inner friction pad and the outer friction pad and moved to press the disc, a supporting member supporting the wedge members, and a driving unit operating the wedge members,
wherein the driving unit comprises a screw axis mounted to the supporting member, a driving motor driving the screw axis, a worm mounted to a shaft of the driving motor and a worm wheel mounted in the middle of the screw axis, and a moving member moved by rotation of the screw axis, and
the driving motor is disposed at a lower part of the supporting member, in a manner that the shaft thereof is mounted in a direction across the screw axis and a pressing direction of the inner friction pad.

9. The disc brake according to claim 8, wherein the wedge members have inclined surfaces symmetrically formed into a ridge shape on both rear sides thereof.

10. The disc brake according to claim 9, wherein the supporting member comprises a V-section depression shaped corresponding to the inclined surfaces of the wedge members.

11. The disc brake according to claim 8, wherein the worm wheel is mounted in the middle of the screw axis, and the moving member is mounted to the screw axis at both sides of the worm wheel.

12. The disc brake according to claim 8, wherein the wedge members comprise:
locking recesses for engagement with the moving member; and
guide members mounted in the locking recesses to guide the operation of the wedge members.

13. The disc brake according to claim 8, wherein the supporting member comprises a motor receiving part receiving a part of the driving motor.

14. The disc brake according to claim 8, wherein the supporting member further comprises a supporting plate supporting the wedge members.

15. A disc brake for a vehicle, comprising:
an inner friction pad and an outer friction pad disposed at both sides of a disc;
a caliper housing supporting the outer friction pad;
a wedge member disposed at a rear side of the inner friction pad and formed with inclined surfaces symmetrically formed into a ridge shape on a rear surface thereof;
a supporting member having V-section inclined surfaces corresponding to the inclined surfaces of the wedge member and fixed to the caliper housing;
a screw axis mounted to the supporting member and extended in a rotating direction of the disc;
a driving motor mounted in a manner that a shaft thereof is mounted in a direction across the screw axis and a pressing direction of the inner friction pad;
a worm mounted to the shaft of the driving motor and a worm wheel mounted in the middle of the screw axis to be engaged with the worm; and
moving members mounted at both sides of the worm wheel and moved by rotation of the screw axis, thereby pressing the wedge member in a rotating direction of the disc.

16. The disc brake according to claim 15, wherein the wedge member comprises:
locking recesses for engagement with the moving members; and
guide members mounted in the locking recesses to guide the operation of the wedge member.

17. The disc brake according to claim 15, wherein the supporting member comprises a motor receiving part receiving a part of the driving motor.

* * * * *